(12) United States Patent  (10) Patent No.: US 7,716,400 B2
Raines  (45) Date of Patent: May 11, 2010

(54) DUAL MODE DIGITAL MULTIMEDIA CONNECTOR

(75) Inventor: Moshe Raines, Tel Aviv (IL)

(73) Assignee: SanDisk IL Ltd., Kfar Saba (IL)

( * ) Notice: Subject to any disclaimer, the term of this patent is extended or adjusted under 35 U.S.C. 154(b) by 96 days.

(21) Appl. No.: 11/747,928

(22) Filed: May 14, 2007

(65) Prior Publication Data

US 2008/0005424 A1    Jan. 3, 2008

Related U.S. Application Data

(60) Provisional application No. 60/747,194, filed on May 14, 2006.

(51) Int. Cl.
*G06F 13/12* (2006.01)

(52) U.S. Cl. .............................. 710/74; 710/8; 710/11; 710/13; 710/14; 710/62

(58) Field of Classification Search ....................... None
See application file for complete search history.

(56) References Cited

U.S. PATENT DOCUMENTS

| | | | | |
|---|---|---|---|---|
| 6,073,201 | A * | 6/2000 | Jolley et al. ................. | 710/315 |
| 6,775,715 | B2 * | 8/2004 | Spitaels et al. ................. | 710/8 |
| 6,934,467 | B1 * | 8/2005 | Herz ........................ | 386/125 |
| 2001/0049826 | A1 | 12/2001 | Wilf | |
| 2004/0056841 | A1 | 3/2004 | Slotta | |
| 2004/0182938 | A1 | 9/2004 | Chen et al. | |
| 2005/0005045 | A1 * | 1/2005 | Kim et al. ..................... | 710/74 |

(Continued)

FOREIGN PATENT DOCUMENTS

EP     0 974 945 A2    1/2000

(Continued)

OTHER PUBLICATIONS

Notification of Transmittal of the International Search Report and the Written Opinion of the International Searching Authority, or the Declaration for International Application No. PCT/IL2007/000630 (Nov. 20, 2007).

(Continued)

*Primary Examiner*—Eron J Sorrell
(74) *Attorney, Agent, or Firm*—Jenkins, Wilson, Taylor & Hunt, P.A.

(57) ABSTRACT

The present disclosure relates to a portable storage device that can communicate with different types of host devices. In some embodiments, the portable storage device receives digital media content via a multi-mode device port and exports a derivative of the digital media content (for example, a media stream) via the same multi-mode device port. In some embodiments, the device port has at least one selectively active pin which is active when receiving digital media content and is dormant when exporting a derivative of the digital media content. Alternatively or additionally, the device port includes at least one selectively active pin which is dormant when receiving digital media content and is active when exporting a derivative of the digital media content. In some embodiments, the portable storage device selects a device mode and/or communications protocol in accordance with at least one detected feature of a complementary port and/or a host. Methods for operating the presently disclosed portable external storage device are disclosed herein.

25 Claims, 14 Drawing Sheets

U.S. PATENT DOCUMENTS

| | | |
|---|---|---|
| 2005/0135792 A1 | 6/2005 | Han |
| 2005/0227773 A1 | 10/2005 | Lu et al. |
| 2006/0068729 A1 | 3/2006 | Yu et al. |
| 2006/0131156 A1 | 6/2006 | Voelckers |
| 2006/0146017 A1 | 7/2006 | Leung et al. |
| 2006/0294306 A1 | 12/2006 | Hong |
| 2007/0247551 A1 | 10/2007 | Raines |
| 2007/0250193 A1 | 10/2007 | Raines et al. |
| 2007/0260808 A1 | 11/2007 | Raines et al. |
| 2007/0263473 A1 | 11/2007 | Raines |
| 2007/0273643 A1 | 11/2007 | Erez et al. |

FOREIGN PATENT DOCUMENTS

| | | |
|---|---|---|
| EP | 1 583 363 A1 | 10/2005 |
| EP | 1 635 351 A2 | 3/2006 |
| FR | 1 315 361 | 5/2003 |
| WO | WO 01/61932 A1 | 8/2001 |
| WO | WO 01/61974 A1 | 8/2001 |
| WO | WO2005/069614 | 7/2005 |
| WO | WO 2005/124932 A2 | 12/2005 |
| WO | WO2006/073444 | 7/2006 |
| WO | WO 2007/122606 A1 | 11/2007 |
| WO | WO 2007/122612 A1 | 11/2007 |
| WO | WO 2007/129314 A1 | 11/2007 |
| WO | WO 2007/132462 A1 | 11/2007 |
| WO | WO 2007/135686 A3 | 11/2007 |

OTHER PUBLICATIONS

Notification of Transmittal of the International Search Report and the Written Opinion of the International Searching Authority, or the Declaration for International Application No. PCT/IL2007/000545 (Oct. 5, 2007).

Notification of Transmittal of the International Search Report and the Written Opinion of the International Searching Authority, or the Declaration for International Application No. PCT/IL2007/000493 (Sep. 28, 2007).

Notification of Transmittal of the International Search Report and the Written Opinion of the International Searching Authority, or the Declaration for International Application No. PCT/IL2007/000477 (Aug. 28, 2007).

Chinese Official Action for Chinese Application No. 200780014016.6 (Dec. 25, 2009).

Chinese Official Action for Chinese Application No. 200780014150.6 (Mar. 1, 2010).

Official Action for U.S. Appl. No. 11/716,648 (Jan. 20, 2010).

\* cited by examiner

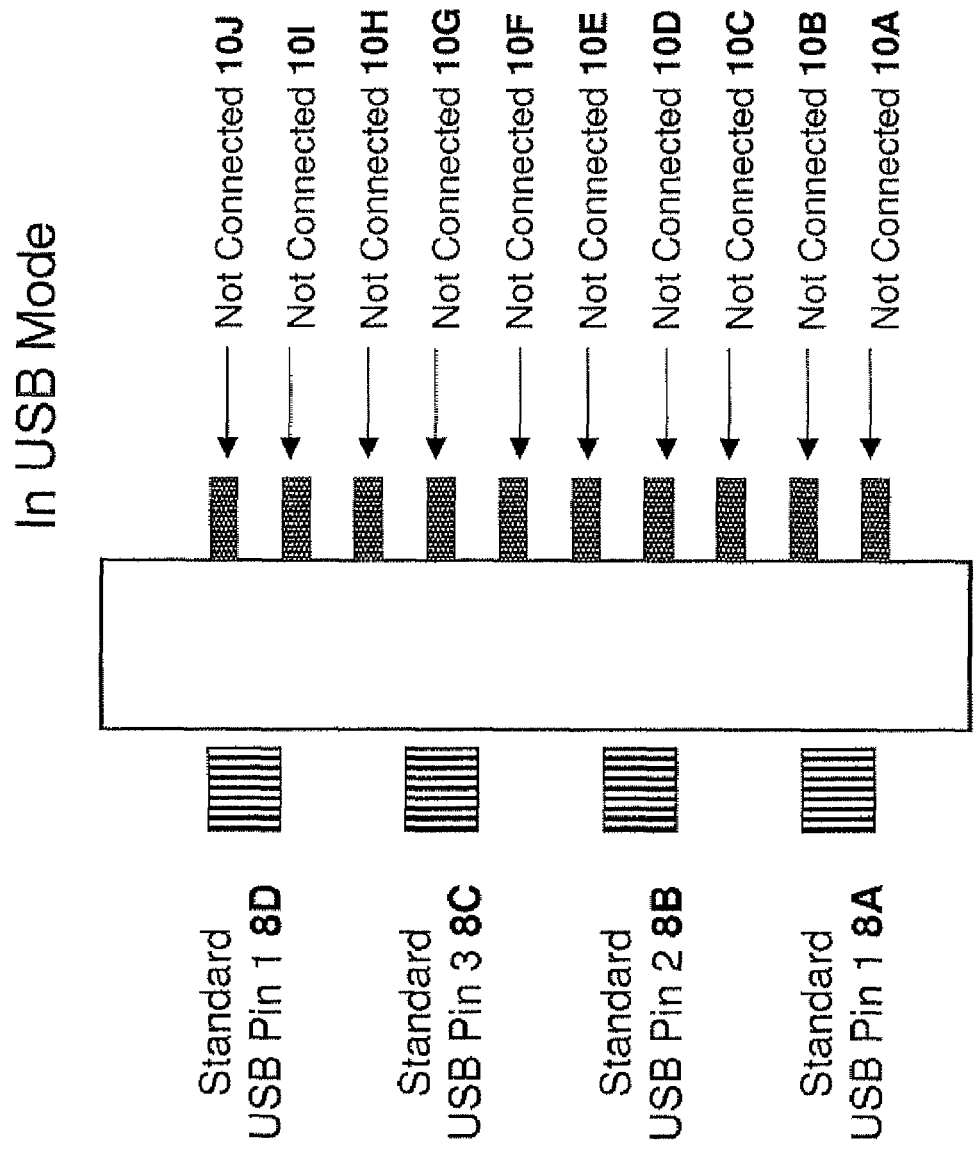

DUAL MODE DIGITAL MULTIMEDIA CONNECTOR

CROSS-REFERENCE TO ELATED APPLICATIONS

This patent application claims the benefit of U.S. Provisional Patent Application No. 60/747,194 filed May 14, 2006.

This application is related to U.S. patent application Ser. No. 11/747,929 of the same inventors, which is entitled "DUAL MODE DIGITAL MULTIMEDIA CONNECTOR" and filed on the same day as the present application. The latter application, also claiming priority from U.S. Provisional Patent Application No. 60/747,194, is incorporated in its entirety as if fully set forth herein.

FIELD OF THE INVENTION

The present invention relates to an external storage device having a multi-mode port.

BACKGROUND AND RELATED ART

Digital multimedia players (for example, DVD players or personal computers on which a digital media playback application resides) are well known in the art as devices that convert digital data into streaming video or audio (i.e. to generate an analog and/or a digital stream). It is common to operatively couple the digital media player to a 'presentation device' (for example, TV set or speaker) which receives and 'presents' (i.e. by displaying a series of images and/or generating sound waves) the video or audio stream.

With reference to FIG. 1, it is noted that one salient feature of digital multimedia players 100 is that (i) digital media 120 may be received via a first 'port' 110 (for example, a USB port, a port for receiving DVDs, a port coupled to a modem, etc) and (ii) a derivative of the digital media, namely streaming video and/or audio is exported 140 by a second 'port' 130 separate from the input—for example, an S-Video output, an analog video output, an audio output port, etc. The exported media stream is presented by a presentation device 150.

The present disclosure relates to portable storage devices (PSDs) that can receive digital media content (e.g. one or more files) from an external device (i.e. coupled to the PSD either by direct mating for via an external cable or cradle), can 'playback' the digital media content to generate a media stream, and can export this media stream to an external presentation device. In one non-limiting example, the PSD has a form factor similar to USB flash drives (UFDs) such as the Cruzer∃ flash drive from SanDisk Corporation (Milpitas, Calif.).

SUMMARY

The present inventor is now disclosing that instead of using the architecture described in FIG. 1, it is possible to have a portable storage device (PSD) that includes a single multi-function port (for example, a plug or male 'connector') that is used both for receiving digital media content (for example, files) and for exporting streaming media derived from the digital media content. In one specific example, this could provide a streamlined user interface where a user does not have to pay attention to which specific device port is used for mating with a host side port.

Furthermore, in some embodiments, the portable storage device is operative, in response to one or more detected features of the host and/or of a host-side port, to recognize which of the two functions to invoke, and to adjust the 'device mode' and/or communications protocol accordingly. This may, in some embodiments, provide a 'plug-and-play' user experience for a multi-function portable storage device where the functionality of the PSD is determined, at least in part, by the host type to which the PSD is coupled.

Thus, in accordance with some aspects of the present invention, it is now disclosed for the first time an external storage device comprising: a) a multi-mode device port configured for inter-device mating with a complementary host-side port, the multi-mode device port having a plurality of pins; b) a device controller operative to communicate via the multi-mode data port, wherein: i) the multi-mode device port and device controller are operative to: A) receive digital media content data via the multi-mode port; and B) export a derivative of the received digital media content; and ii) the plurality of pins includes at least one selectively active pin that is: A) active during one of the receiving and the exporting; and B) dormant during the other of the receiving and the exporting.

Not wishing to be bound by any theory, it is disclosed that different host types may be associated with different types of host-side ports, each host-side port having its own shape and/or pin scheme. In some embodiments, the presently-disclosed external storage device obviates the need to include multiple device ports on a single device such that each device port is configured to mate with a different type of host-side port. Instead, it is possible to provide a 'multi-mode' device port which is dimensioned and electrically configured to mate with different host-side ports.

Thus, in some embodiments, different sets of pins are provided in a single plug and/or single socket. In a sense, this may break the given paradigm of a given port type (i.e. the paradigm that USB ports have only 4 pins, etc). Nevertheless, the present inventors have noticed that, surprisingly, it is possible to provide different sets of pins in a single plug and/or socket (for example, a first set of pins for mating with a USB socket and a second set of pins for mating with an analog TV socket).

Although not a requirement, in some embodiments, because the multi-mode port can made with different types of host-side ports, there is no need to include additional ports on the portable storage device, and the portable storage device includes only a single port—namely, the multi-mode device port (i.e. the device has no other ports).

In some embodiments, the device receives digital media content from a first host type and exports a derivative of digital media content to a second host type. In one example, the exported 'derivative' of the digital media content is an analog and/or digital media stream (i.e. a video stream and/or audio stream).

According to some embodiments, at least one selectively active pin is: i) active during the receiving; and ii) dormant during the exporting.

According to some embodiments, at least one selectively active pin is: i) active during the exporting; and ii) dormant during the receiving.

According to some embodiments, the plurality of pins further includes at least one commonly active pin that is active both during the receiving and the exporting.

According to some embodiments, the external storage device at least one commonly active pin, i) is a data pin during the receiving; and ii) is a voltage supply during the exporting.

According to some embodiments, at least one commonly active pin: i) is a digital data pin during the receiving; and ii) is an analog data pin during the exporting.

According to some embodiments, the plurality of pins includes only selectively active pins.

According to some embodiments, the multi-mode device port is a male port.

According to some embodiments, the male port is dimensioned to mate with a standard USB socket.

According to some embodiments, the multi-mode device port and the device controller are operative to: i) detect at least one feature of at least one of: A) a complementary port mated to the multi-mode device port; and B) a host connected to the complementary port; and ii) in response to results of the detecting, activate at least one selectively active pin.

According to some embodiments, at least one feature includes an active/dormant status feature of at least one location of the complementary port (i.e. the feature relates to whether or not the complementary provides an electrically 'active' pin at a given location).

According to some embodiments, the multi-mode device port and the device controller are operative to effect the detecting of the active/dormant status feature of the at least one location of the complementary port by determining an active/dormant status of at least one pin of the plurality of pins of the multi-mode device port.

According to some embodiments, the at least one feature includes a mechanical feature (for example, a shape feature) of the complementary port.

According to some embodiments, the multi-mode device port and the device controller are operative to: i) detect at least one feature of at least one of: A) a complementary port mated to the multi-mode device port; and B) a host connected to the complementary port; and ii) in response to results of the detecting, select and adopt one of: A) a first device mode where the external storage device is operative to effect the receiving of the digital media content; and B) a second device mode where the external storage device is operative to effect the exporting of the derivative of the digital media content.

According to some embodiments, the multi-device port and the device controller are operative such that the exporting of the derivative includes exporting a media stream derived from the digital media content.

Exemplary streaming media protocols include but are not limited to: audio protocols, video protocols, multimedia protocols, composite video protocols, Y/C (SVHS) video, RGB, complementary video and HDMI video formats.

According to some embodiments, the multi-mode device port and the device controller are operative such that the receiving is carried out using a first communications protocol and the exporting is carried out using a second communications protocol different from the first communication protocol.

It is now disclosed for the first time an external storage device comprising: a) a multi-mode device port configured for inter-device mating with a complementary host-side port, the multi-mode device port having a plurality of pins; b) a device controller operative to communicate via the multi-mode data port, wherein the multi-mode device port and device controller are operative to: i) communicate via the multi-mode port using a first communications protocol when a given pin of the plurality of pins is active; and ii) communicate via the multi-mode port using a second communications protocol different from the first communications protocol when the given pin of the plurality of pins is dormant.

According to some embodiments, i) one of the first communications protocol and the second communications protocol is a digital communications protocol; and ii) the other of the first and second communications protocol is an analog communications protocol.

According to some embodiments, at least one of the first and second communications protocol is a streaming media protocol.

Exemplary streaming media protocols include but are not limited to: audio protocols, video protocols, multimedia protocols, composite video protocols, Y/C (SVHS) video, RGB, complementary video and HDMI video formats.

It is now disclosed for the first time an external storage device comprising: a) a multi-mode device port dimensioned for inter-device mating with USB socket; b) a device controller operative to communicate via the multi-mode device port using: i) a USB protocol when the external storage device is in a first device mode; and ii) a protocol other than the USB protocol when the external storage device is in a second mode device mode different from the first device mode.

According to some embodiments, the multi-mode device port and the device controller are operative detect at least one feature of at least one of: A) a complementary port mated to the multi-mode device port; B) a host connected to the complementary port; and to select one of i) the USB protocol; and ii) the protocol other than the USB protocol, in accordance with at least one detected feature.

According to some embodiments, the at least one feature includes an active/dormant status feature of at least one location of the complementary port (i.e. which is coupled to the device port).

According to some embodiments, the multi-mode device port and the device controller are operative to effect the detecting of the active/dormant status feature of the at least one location of the complementary port by determining an active/dormant status of at least one pin of the plurality of pins of the multi-mode device port.

According to some embodiments, the at least one feature includes a mechanical feature of the complementary port.

It is now disclosed for the first time an external storage device comprising: a) a multi-mode device port configured for inter-device mating with a complementary host-side port; b) a data controller operative to communicate via the multi-mode device port using a given protocol selected from a plurality of protocols, wherein the data controller is operative to select the given protocol in accordance with an active/dormant status of at least one pin of the multi-mode data port.

It is now disclosed for the first time an external storage device comprising: a) a multi-mode device port configured for inter-device mating with a complementary host-side port; b) a device controller operative to communicate via the multi-mode data port, wherein the multi-mode device port and device controller are operative to: i) receive digital media content data via the multi-mode port when the device is in a first device mode; and ii) export a derivative of the received digital media content when the device is in a second device mode; and wherein the device controller is operative to select one of the first and second device modes in accordance with an active/dormant status of at least one pin of the multi-mode data port.

It is now disclosed for the first time an external storage device comprising: a) a multi-mode device port configured for inter-device mating with a complementary host-side port having a plurality of pins, thereby coupling with a host device via the multimode data port and the complementary host-side port; b) a device controller operative to communicate via the multi-mode data port, wherein the multi-mode device port and device controller are operative to: i) receive digital media content data via the multi-mode port when the device is in a first mode; and ii) export a derivative of the received digital media content when the device is in a second mode; and wherein the device controller is operative to select one of the first and second modes without using results of any query to the host device (i.e. there is no need for the external storage device to query the host).

It is now disclosed for the first time a method of operating an external storage device having a multi-pin device port, the method comprising: a) receiving digital media content data via the multi-pin device port; and b) exporting a derivative of the received multi-pin device port via the multi-pin device port, wherein at least one pin of the multi-pin device port behaves, during the receiving and the exporting, as a selectively active pin that is: i) active during one of the receiving and the exporting; and ii) dormant during the other of the receiving and the exporting.

According to some embodiments, i) the digital media content is received from a first host device when the external storage device is coupled to the first host device; and ii) the derivative of the digital media content is exported to a second host device different from the first host device when the external storage device is coupled to the second host device.

According to some embodiments, at least one selectively active pin is: i) active during the receiving; and ii) dormant during the exporting.

According to some embodiments, at least one selectively active pin is: i) active during the exporting; and ii) dormant during the receiving.

According to some embodiments, at least one pin other than the at least one selectively active bin behaves, during the receiving and exporting, as a commonly active pin that is active during both the receiving and the exporting.

According to some embodiments, the commonly active pin: i) provides data pin functionality during the receiving; and ii) provides voltage pin functionality supply during the exporting.

According to some embodiments, at least one commonly active pin: i) provides digital data pin functionality during the receiving; and ii) provides analog data pin functionality during the exporting.

According to some embodiments, the method is carried out such that every pin of the multi-pin device port behaves as a selectively active pin during the receiving and tile exporting.

According to some embodiments, the multi-pin device port is mated with a first socket during the receiving and a second socket during the exporting.

According to some embodiments, i) the first socket is a standard USB socket; and ii) the second socket is other than a USB socket.

According to some embodiments, the method further includes: c) for at least one of the receiving and the exporting, upon mating with a complementary port connected to a host device, i) detecting at least one feature of at least one of the complementary port the connected host; and ii) in response to results of the detecting, selectively activating at least one selectively active pin.

According to some embodiments, the detecting of the at least one feature includes detecting an active/dormant status feature of at least one location of the complementary port.

According to some embodiments, the detecting of the active/dormant status feature of the at least one location of the complementary port includes determining an active/dormant status of at least one pin of the plurality of pins of the multi-mode device port.

According to some embodiments, the detecting of the at least one feature includes detecting a mechanical feature of the complementary port.

According to some embodiments, the method further includes: c) for at least one of the receiving and the exporting, upon mating with a complementary port connected to a host device, i) detecting at least one feature of at least one of: the complementary port the connected host; and ii) in response to results of the detecting, selecting and adopting one of: A) a first device mode where the external storage device is operative to effect the receiving of the digital media content; and B) a second device mode where the external storage device is operative to effect the exporting of the derivative of the digital media content.

According to some embodiments, the exporting of the derivative includes exporting a media stream derived from the digital media content.

Exemplary streaming media protocols include but are not limited to: audio protocols, video protocols, multimedia protocols, composite video protocols, Y/C (SVHS) video, RGB, complementary video and HDMI video formats.

According to some embodiments, the receiving is carried out using a first communications protocol and the exporting is carried out using a second communications protocol different from the first communication protocol.

It is now disclosed for the first time a method of operating an external storage device having a multi-pin device port including a plurality of pins, the method comprising: i) communicating via the multi-pin device port using a first communications protocol when a given pin of the plurality of pins is active; and ii) communicating via the multi-pin device port using a second communications protocol different from the first communications protocol when the given pin of the plurality of pins is dormant.

According to some embodiments, i) one of the first communications protocol and the second communications protocol is a digital communications protocol; and ii) the other of the first and second communications protocol is an analog communications protocol.

According to some embodiments, at least one of the first and second communications protocol is a streaming media protocol.

It is now disclosed for the first time a method of operating an external storage device having a multi-pin device port including a plurality of pins, the method comprising: a) when the device port is coupled to a first complementary port that is a USB socket, communicating via the device port using a USB protocol; and b) when the device port is coupled to a second complementary port that is not a USB socket (i.e. that is not shaped to mate with a standard USB plug), communicating via the device port using a protocol different from the USB protocol.

According to some embodiments, the method further includes: c) upon mating with one of the first complementary port and the second complementary port, detecting at least one feature of at least one of: i) a currently-mated complementary port; and ii) a host connected to the currently-mated complementary port; and d) in accordance with results of the detecting, selecting one of i) the USB protocol; and ii) the protocol other than the USB protocol.

According to some embodiments, the detecting of the at least one feature includes detecting an active/dormant status feature of at least one location of the currently-mated complementary port.

According to some embodiments, the detecting of the at least one feature includes the detecting of the active/dormant status feature of the at least one location of the complementary port by determining an active/dormant status of at least one pin of the plurality of pins of the multi-mode device port.

According to some embodiments, the detecting of the at least one feature includes detecting a mechanical feature of the currently-mated complementary port.

It is now disclosed for the first time a method of operating an external storage device having a multi-pin device port, the method comprising: a) upon mating between the device port and a complementary port, detecting an active/dormant status of at least one pin of the multi-pin device port that is mated to the complementary port; and b) in accordance with results of the detecting, selecting a communications protocol from a plurality of communications protocols; and c) effecting at least one communication via the device port and the complementary port using the selected communications protocol.

It is now disclosed for the first time a method of operating an external storage device having a multi-pin device port, the method comprising: a) upon mating between the device port and a complementary port, detecting an active/dormant status of at least one pin of the multi-pin device port that is mated to the complementary port; and b) in accordance with results of the detecting, selecting a device mode from a plurality of device modes including a first and second device mode; c) if the first device mode is selected, receiving digital media content data via the multi-pin device port; and d) if the second device mode is selected, exporting a media stream via the multi-pin device port.

It is now disclosed for the first time a method of operating an external storage device having a multi-pin device port, the method comprising: a) upon mating between the device port and a complementary port, selecting, by the external storage device, a device mode from a plurality of device modes including a first and second device mode; b) if the first device mode is selected, receiving digital media content data via the multi-pin device port; and c) if the second device mode is selected, exporting a media stream via the multi-pin device port, wherein the selecting is carried out without using results of any query to the host device (i.e. there is no need for the external storage device is send a query to the host device and/or receive a response to a query from the host device).

These and further embodiments will be apparent from the detailed description and examples that follow.

BRIEF DESCRIPTION OF THE DRAWINGS

FIG. 4A-B provide a diagram of exemplary pin schemes of the device of FIG. 3A.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word "may" is used in a permissive sense (i.e., meaning "having the potential to'), rather than the mandatory sense (i.e. meaning "must").

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed external storage device and methods of operating the same is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

Figure 1:
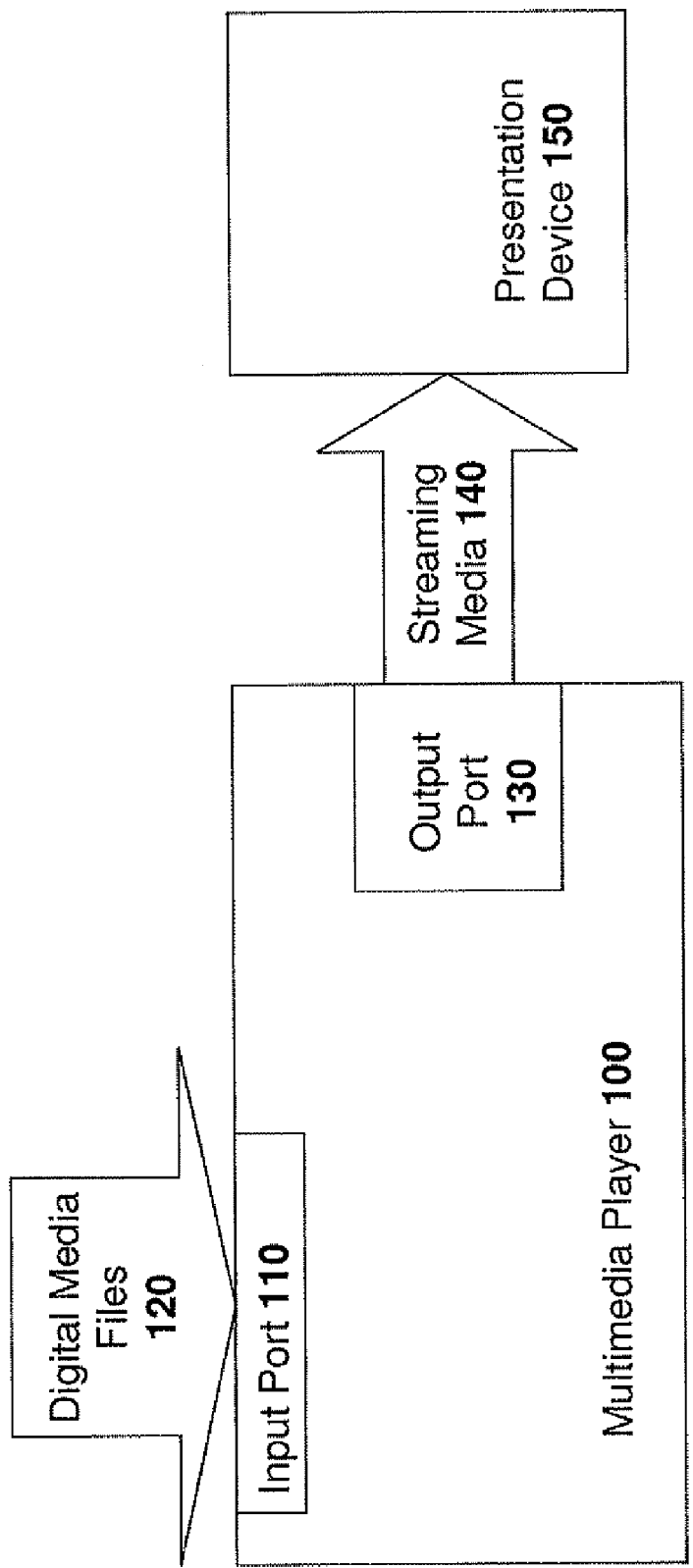
FIG. 1 provides a block diagram of a prior art device including one port for receiving digital media files and a second port for exporting streaming media according to the prior art.
Figure 2A:
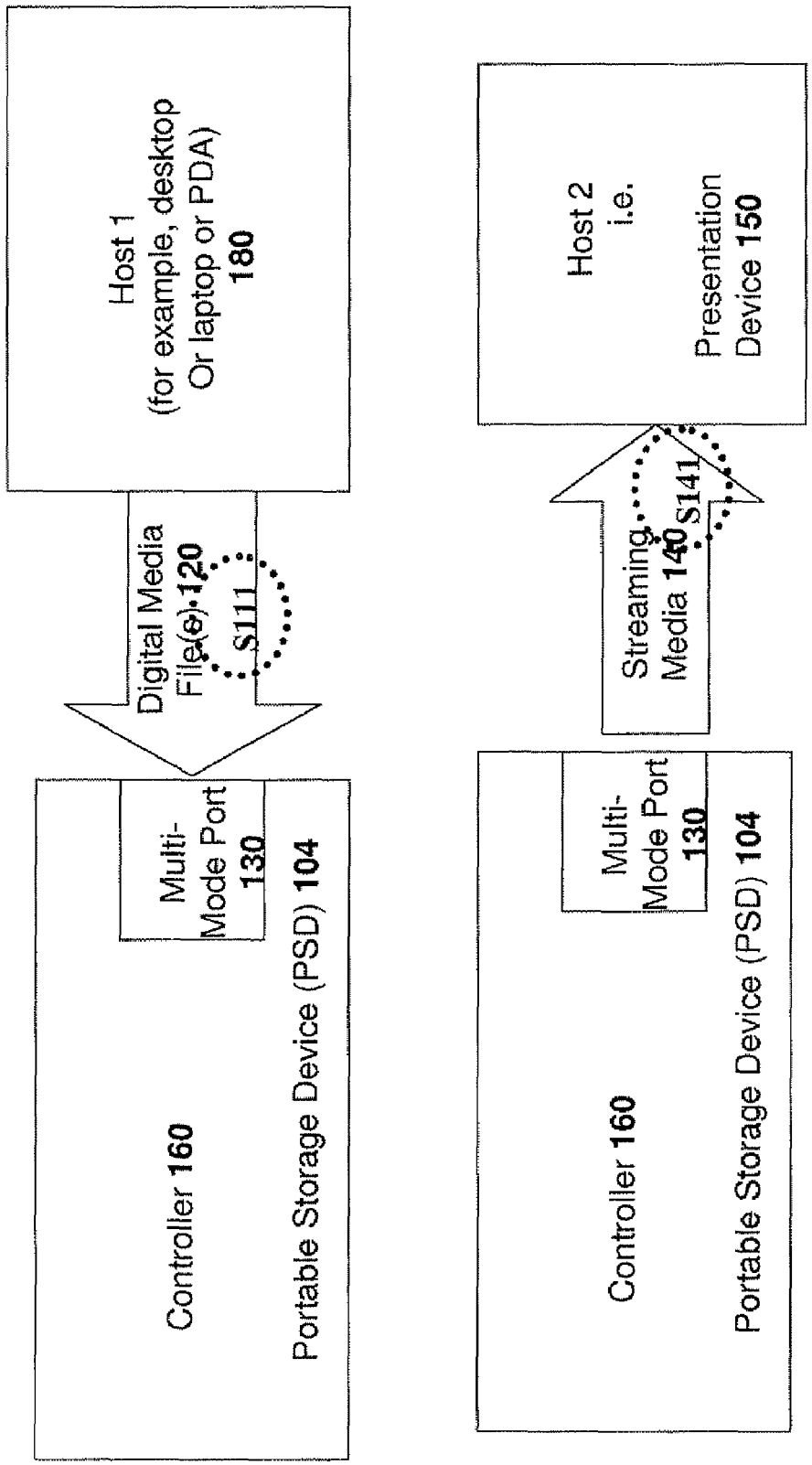
FIG. 2A provides a block diagram explaining how to use an exemplary external storage device in accordance with some embodiments of the present invention.
Figure 2B:
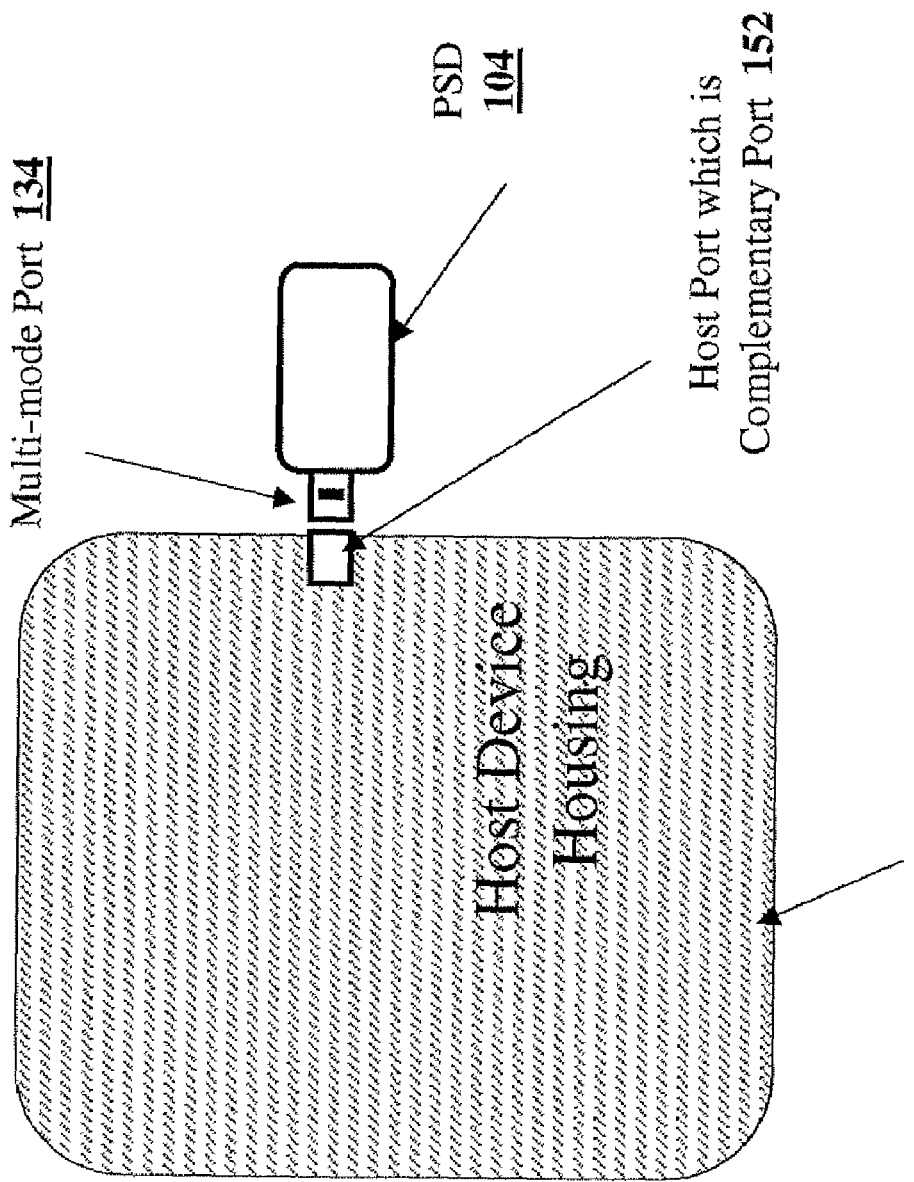
FIG. 2B provides block diagrams of exemplary external storage devices coupled with an exemplary host device via a host-side complementary port that is mechanically integrated with the host device.

With reference to FIG. 2A, it is noted that the present inventor is now disclosing a portable storage device (PSD) 104 that includes a single multi-function port 130 (either a plug or a socket) that is used both for: (i) inputting S111 digital media content such as files from a first host (i.e when the PSD is in a 'first mode') and for (ii) exporting S141 streaming media derived from the digital media content to a second host (i.e. a presentation device—e.g. a video display and/or audio speaker) when the PSD is in a 'second mode.' In the example of FIG. 2, the aforementioned exported media stream(s) (i.e. video stream and/or audio stream) is generated using an onboard media player (not shown) that resides in the PSD 104. When the PSD 104 is coupled with the 'presentation device' 150, it is possible to (i) view on the display screen of the presentation device video streamed from PSD 104 and/or (ii) listen to sounds generated by the speaker of the presentation device from audio streamed from PSD 104.

For the present disclosure, the terms 'portable storage device' (PSD) and 'external storage device' (PSD 104) are used interchangeably.

In some embodiments, the presently disclosed portable storage device (PSD) automatically 'recognizes' the host and/or a property of a 'complementary port' connected to the host, and adjusts the 'device mode' and/or communications protocol accordingly. This may allow for more 'streamlined' device interface.

FIGS. 3A-3C, 4A-4B, 5A-5C, 7 and 8 relate to a specific example where the multi-mode port 130 provides both (i) USB functionality and (ii) 'media output' port functionality.

In the example of FIGS. 3, 4A-4B, 5A-5C, 7 and 8, the PSD 104 determines 'on the fly' which functionality (i.e. of USB functionality or 'media output' port functionality) of the multi-mode port to selectively activate upon mating with a complementary port.

In some embodiments, this determination is made in accordance with one or more detected features of the 'complementary port' with which the multi-mode port 130 mates. In one example (see FIG. 2B), the 'complementary port' is embedded in the housing of the host device, and the PSD 104 may 'dock' to the host device. In another example (see FIG. 2C), the 'complementary port' is provided as part of an external cable or cradle.

Figure 3A:
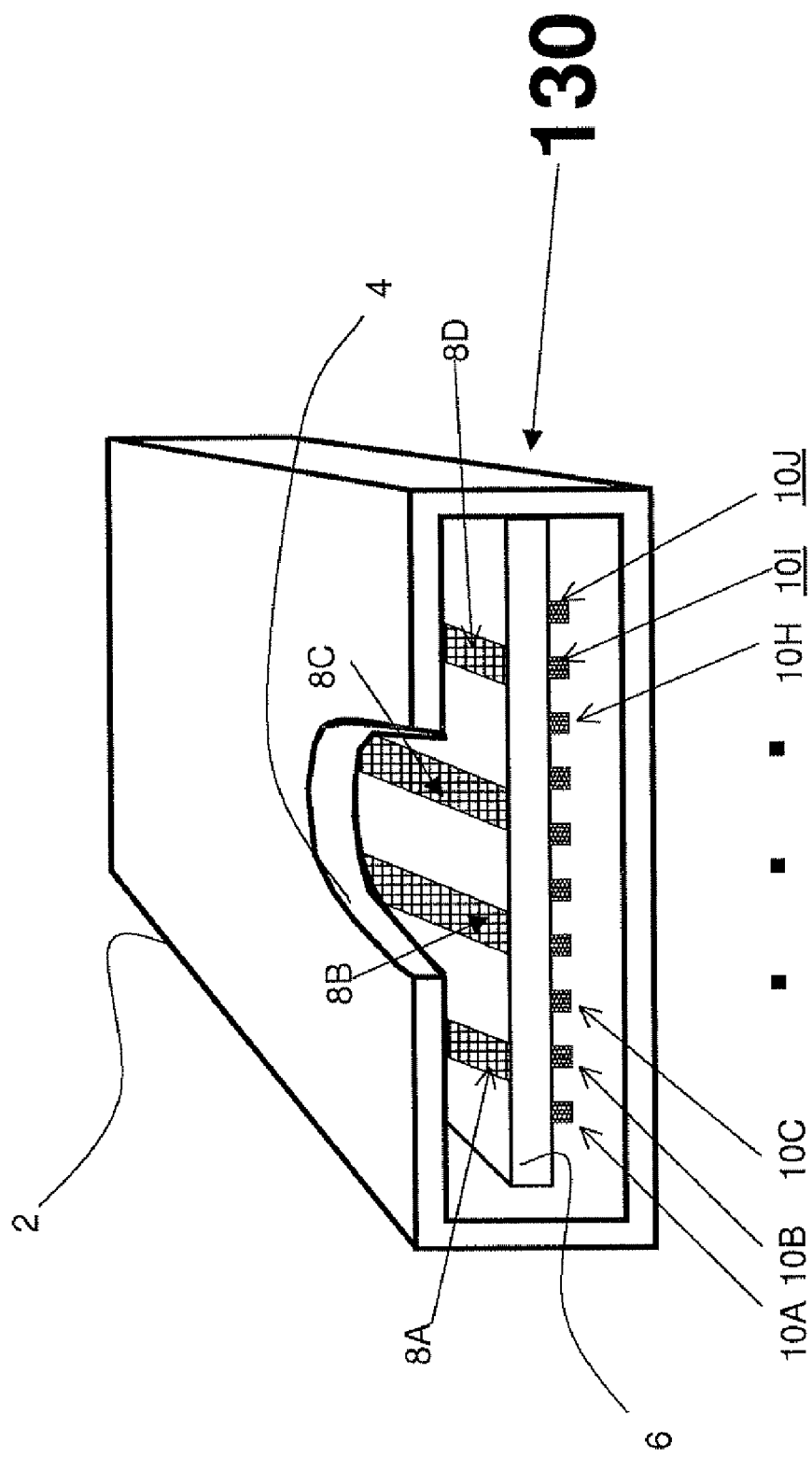
FIG. 3A illustrate an exemplary multi-function device port operative to mate with an analog TV socket and a USB socked in accordance with some embodiments of the present invention.

For the present disclosure, the term 'port' can refer either to a male 'plug' or 'connector' or to a female 'socket.' In the particular example of FIG. 3A, the term port refers to a male 'port.' It is noted that both 'plugs' and 'sockets' typically includes a plurality of 'pins.'

Figure 2C:
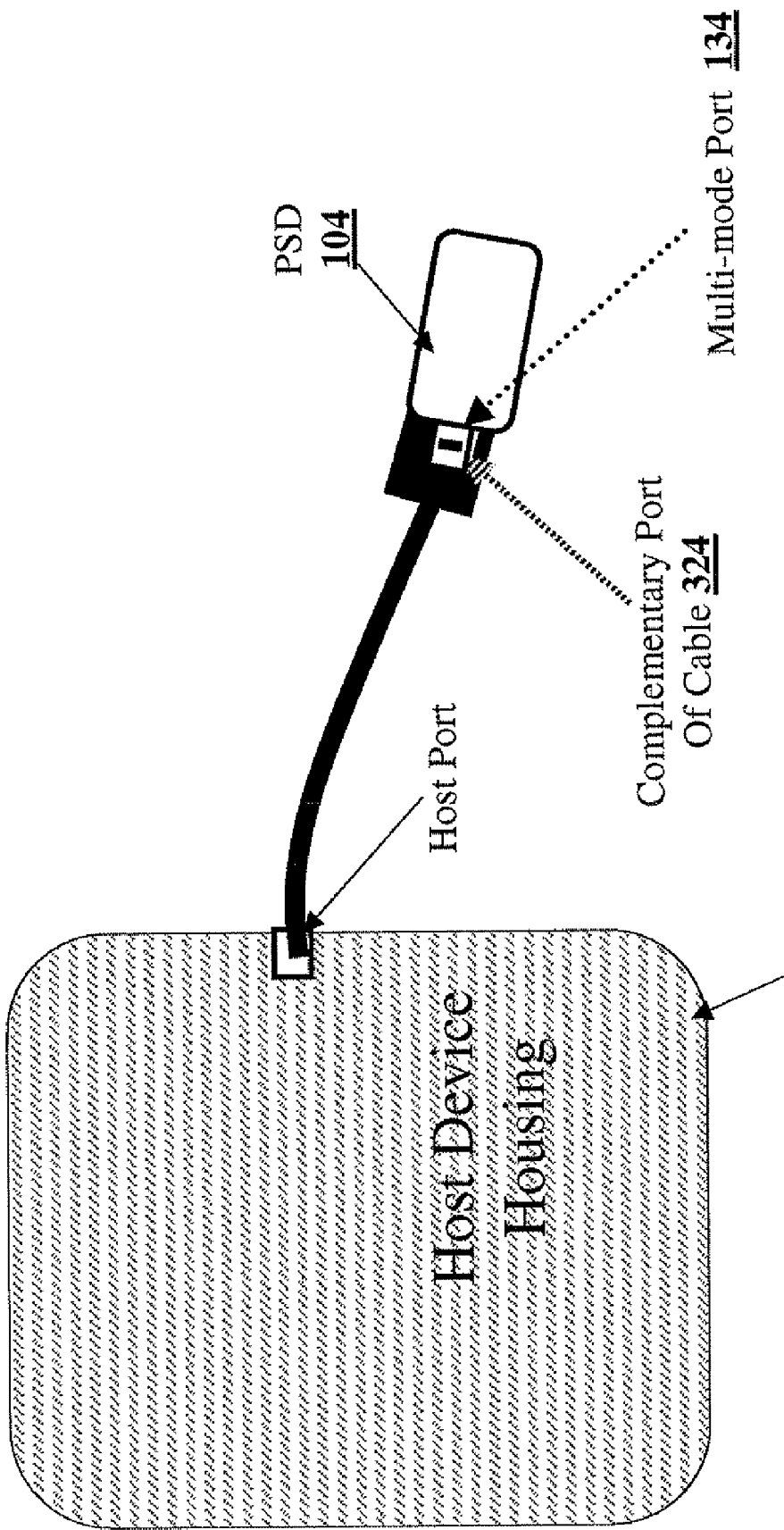
FIG. 2C provides block diagrams of exemplary external storage devices coupled with an exemplary host device via a host-side complementary port that is provided as part of an external cable or cradle.

The term 'complementary port' is a port that is dimensioned to 'mate' with the multi-function port 130 of PSD 104. In the example of FIG. 213, the complementary port 152 is mechanically integrated with the housing of the host deice 150 or 180. In the example of FIG. 2C, the complementary port 324 is provided as part of an external cable.

Although not a requirement, it is noted that the particular PSD 104 has only a single data port 130 and has no other data port, thereby providing a more 'streamlined' interface.

FIG. 3A shows a schematic drawing of a dual mode multimedia connector 130 in according with some embodiments of the present invention. In the example of FIG. 3A, connector 130 is built to comply with the USB standard. Accordingly, connector 130 includes a USB socket compatible shell 2 and inner four contacts pins 8A-8D.

In addition, in the present example, this connector 130 includes ten additional pins 10A-10J and a recess 4. In regular USB operation, the connector 130 is inserted into a standard USB socket (i.e. the 'complementary port' is a standard USB socket—for example, operatively coupled with a first host type 180), hence only the four standard pins 8A-8D are operational.

When plugged into a special multimedia socket (i.e. the 'complementary port' is a multimedia socket'—for example, operatively coupled with the second host type 150—i.e. the 'presentation device), the PSD 104 may automatically identify the 'complementary port' type (i.e. that the complementary port is a multimedia socket rather than a standard USB socket) and initiate a different multimedia protocol using pins 10A-10J.

Figure 3B:
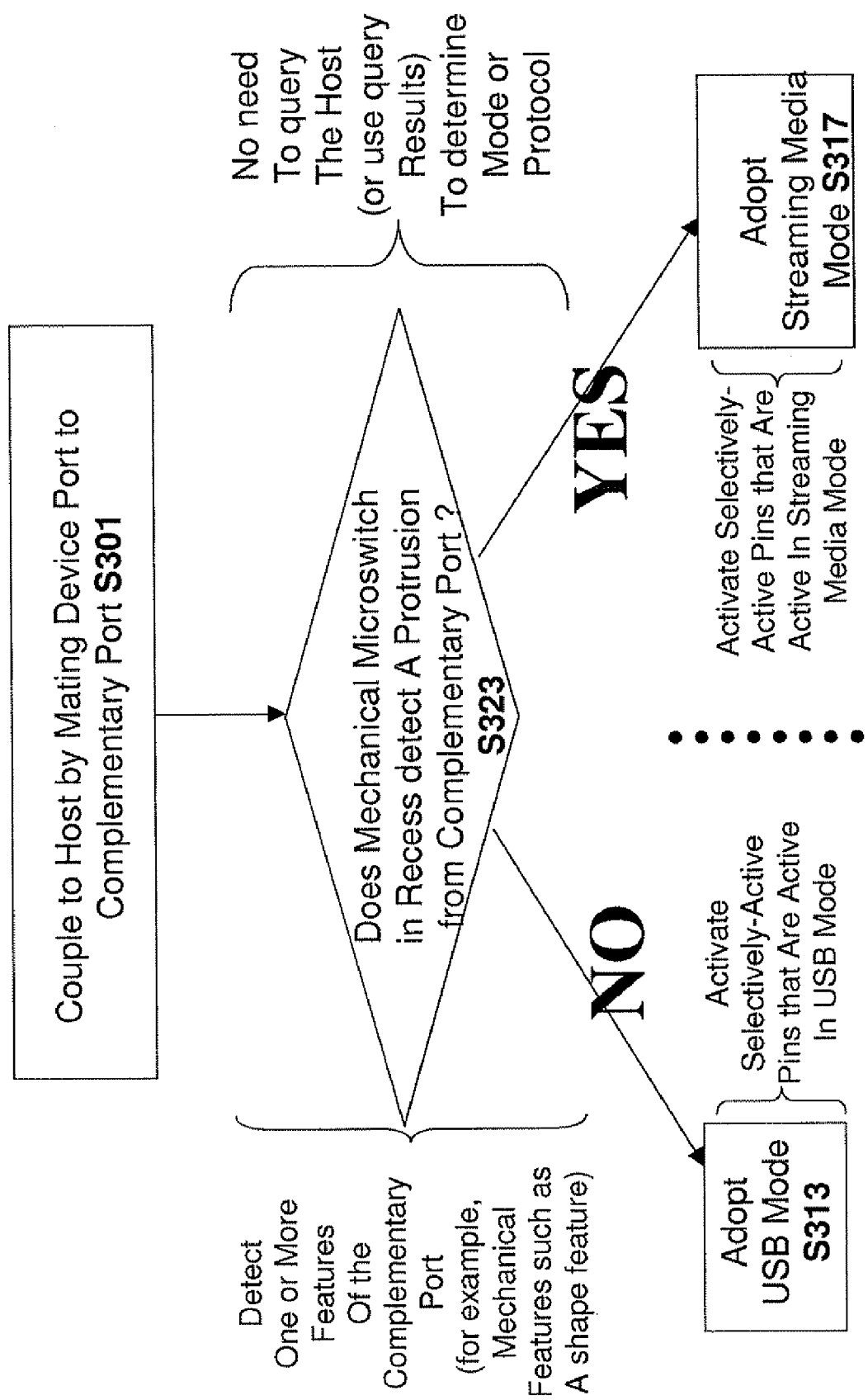
FIG. 3B provides flowchart of an exemplary routine carried out by an external storage device that includes the exemplary multi-function device port of FIG. 3A.
Figure 3C:
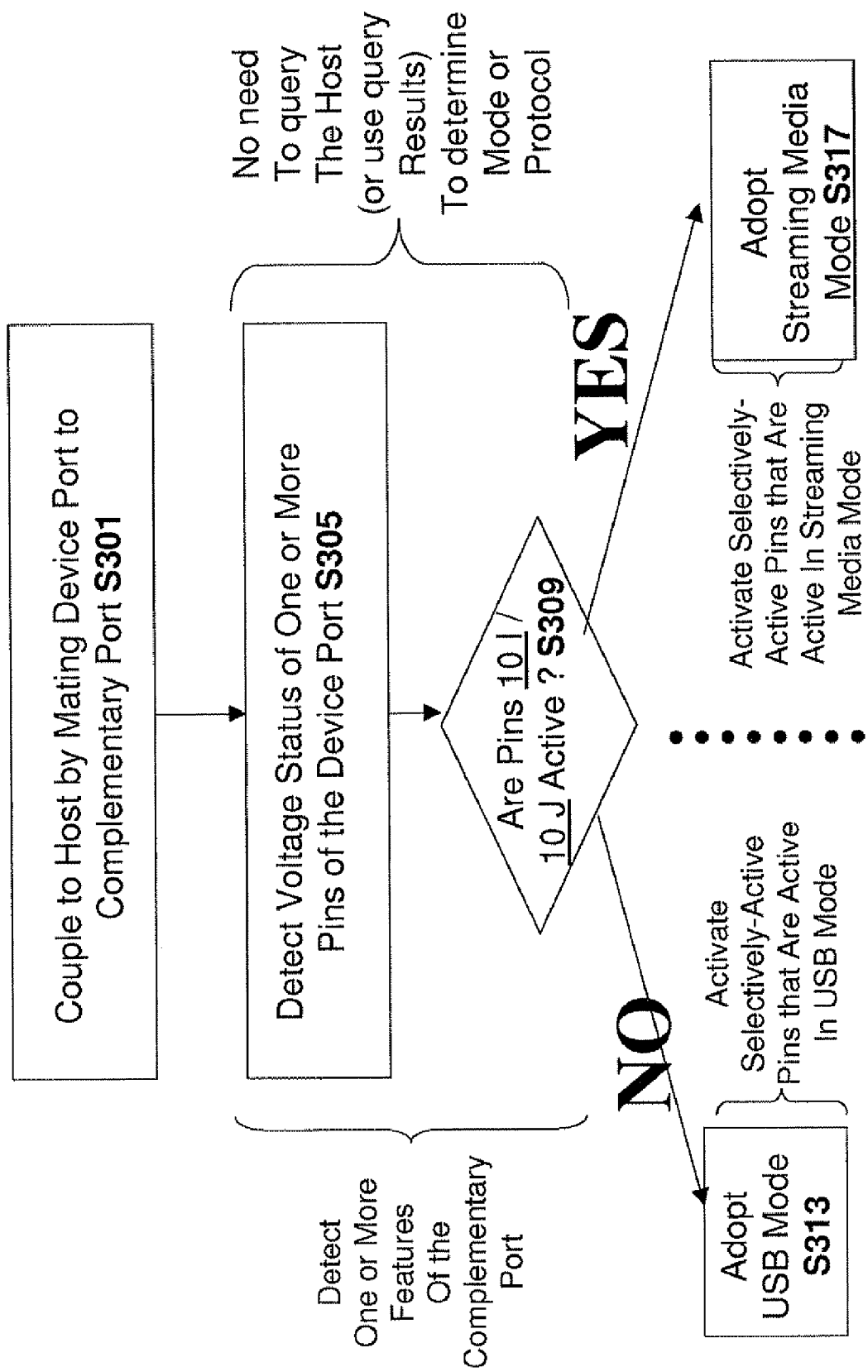
FIG. 3C provides a flowchart of an exemplary routine carried out by an external storage device including the exemplary multi-function device port of FIG. 3A.

Such determination of one or more features of the complementary port (i.e. which is connected to the host) may be performed in several ways including using a mechanical detector (see FIG. 3B) and by electrical means (see FIG. 3C). In the embodiment described in FIG. 3B, a micro switch (not shown) is provided in recess 4 of the PSD 104. This microswitch adopts a first configuration if the 'complementary port' is a socket that has a protrusion that enters the recess upon mating S301 between the multi-mode device port 130 of PSD 104 and the complementary port. Thus, if the complementary port does indeed have protrusion (i.e. which is detected S323 when the microswitch is set by the protrusion), then the PSD 104 adopts S317 "streaming media" mode described in greater detail in FIG. 4B. When in 'streaming media' mode, PSD 104 is operative to export a streaming media signal (i.e. video and/or audio generated, for example, by a media player that resides in PSD 104 and converts a digital file into streaming media) to the host device using a streaming media protocol. Alternatively, if no protrusion is detected 323, then PSD 104 adopts USB S313 mode. As shown in the figure, adopting streaming media S317 or USB S313 modes may include selectively activating certain 'selectively active' pins of device port 130 (i.e. pins that are active in one of the two mode and not in the other of the two modes—e.g. active in USB mode but not streaming media mode or visa versa).

It is noted that step S323 refers to one example of detecting a 'mechanical feature' of the complementary port. In the example of step S323, the mechanical feature is a 'shape feature' of the complementary port (i.e. related to whether or not the complementary port includes a protrusion or not). In another example, a feature related to the mechanical flexibility of the complementary port or an element thereof may be detected.

FIG. 3C provides a flow chart of an alternate routine for detecting one or more features of the complementary port (i.e. which is connected to the host) and selecting a device mode and communications protocol according to yet another embodiment of the present invention. In the example of FIG. 3C, it is noted that if the device port 130 is indeed connected to a TV port (i.e. if the complementary port is an analog TV socket), then certain locations of the device port should be in contact with a 'live' pin of the TV socket that provides voltage. In this case, a specific set of specific pins that includes pins 10I, 10J of FIG. 3A would be in contact with an active pin of the TV socket—thus, if the device port 130 is in mated with a TV socket, pins 10I, 10J would themselves be active. Thus, it is possible to detect if the complementary port is indeed a TV socket by checking S309 if pins 10I, 10J are active or not—i.e. by checking an active/dormant status of pins 10I, 10J. Thus it is noted that checking active/dormant status of one or more pins of the device port 130 is useful for detecting or 'sniffing' one or more features of the complementary port (for example, to determine a complementary port type).

It is noted that it is the host which supplies voltage to the complementary port. Thus, when detecting S305 a voltage status (i.e. whether or not there is voltage), it may be said that the PSD 104 is, indirectly, detecting a feature of the host device itself.

If pins 10I, 10J are active S309, this is indicative that PSD 104 is coupled with a presentation-device host 150 (in this case, this indicates that device port 130 is mated with an analog TV socket), and PSD 104 adopts the S317 the streaming media mode.

As is noted in the comment on the right hand side of FIGS. 3B-3C, using these routines it is possible to detect one or more features of the host and to determine a mode/protocol without sending a query to the host—for example, without attempting to use a 'candidate protocol' and ascertaining host reactions to this attempt.

It should be noted that in the specific example of FIGS. 3A, 3C the identification of an 'active/dormant' status is carried out using two pins 10I, 10J, but other numbers of pins may be designed for identification (i.e. of the host type to which PSA 104 is coupled) as well.

For the present disclosure, a given pin of multi-mode device port 130 or of a complementary port to which device port 130 is mated may be considered 'active' or 'dormant.' Active pins included: i) pins for receiving or providing electrical power; ii) pins for transfer of analog and/or digital data; iii) ground pins. For the present disclosure, any pin that is not 'active' is defined as 'dormant.'

Thus, referring to FIG. 4A, when PSD 104 is in USB mode (i.e. coupled to a USB stocked), pins 8A-8D are 'active' and pins 10A-10J are dormant.

For the present disclosure, an 'active/dormant' status of a given pin(s) refers to if the given pin(s) is 'active' or alternatively 'dormant.' If the pin is 'active' then the 'active/dormant' status is 'active'—otherwise the status is 'dormant.'

One way to detect an 'active/dormant' status of a given pin is to detect a 'voltage status' of the given pin.

Figure 4B:
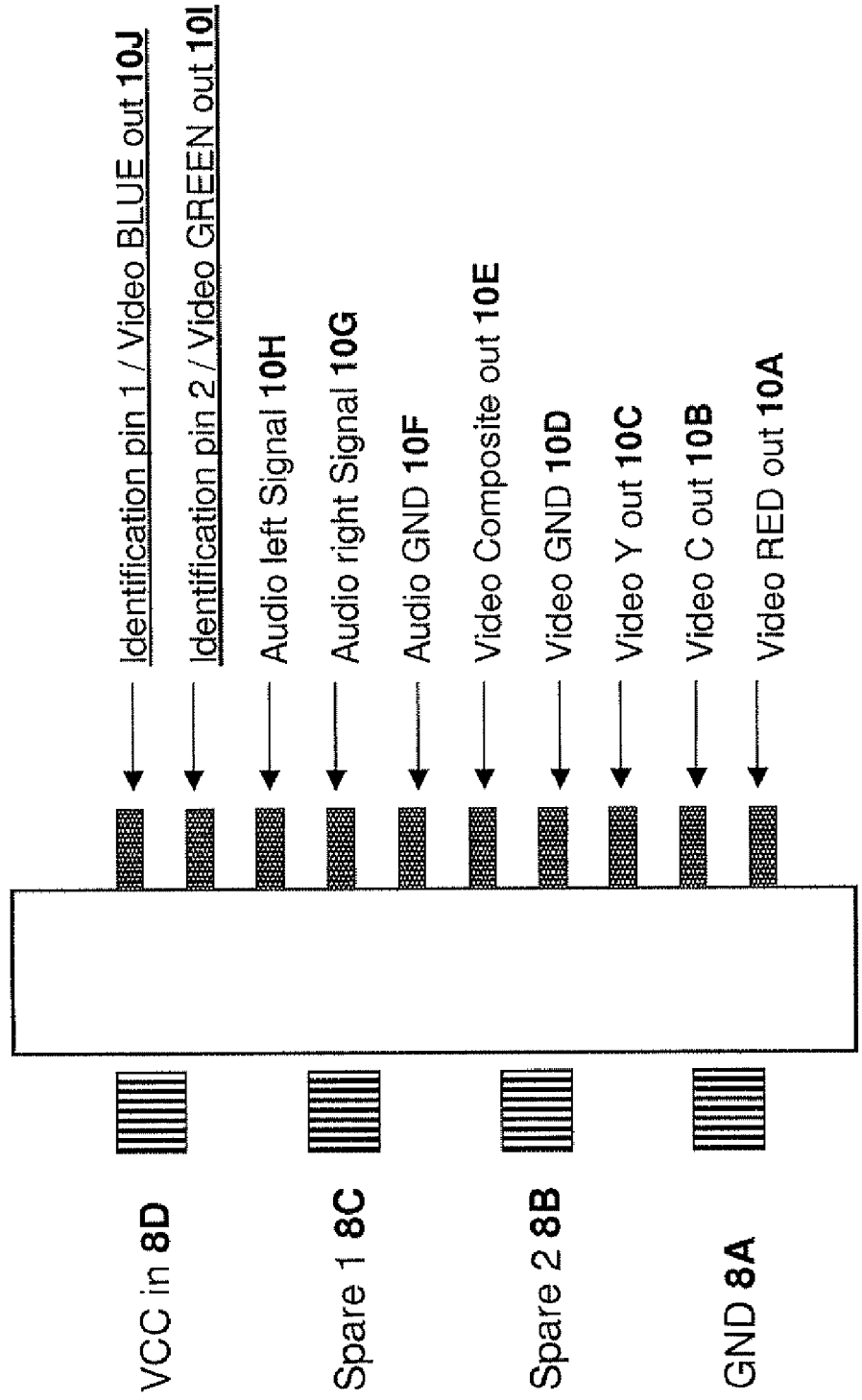

FIG. 4B describes the pin configuration of port 130 when PSD 104 is coupled with a socket of a TV set and is in 'streaming media mode' (i.e. can export streaming video and/or audio to a presentation device host 180 such as a device with a 'TV input'), pins 10A-10J are active (i.e. for sending data) while pins 8A and 8D are active (i.e. for receiving power and ground). In FIG. 4B, pins 8B and 8C are dormant.

It is noted that the typical layout of pins for a digital TV connection can be found in http://www.castel.com.au/Toshiba/brochures/42WP48-37WL48-32WL48.pdf.

Figure 5A:
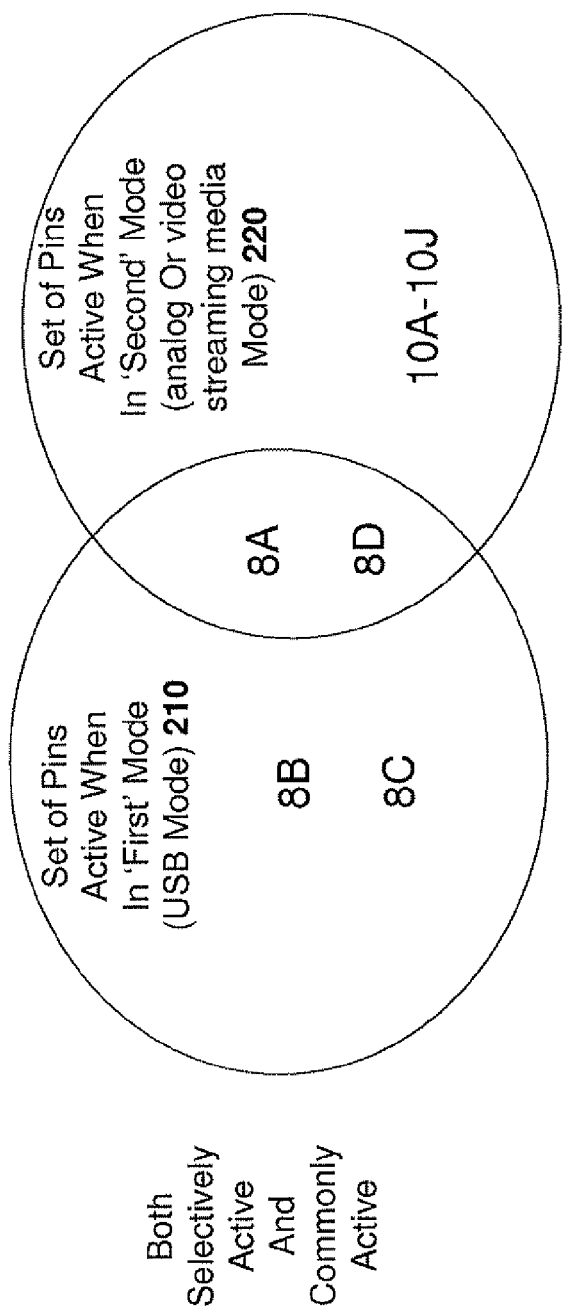
FIGS. 5A-5C provide Venn diagrams illustrating selectively active and/or commonly active pins according to some embodiments.
Figure 5B:
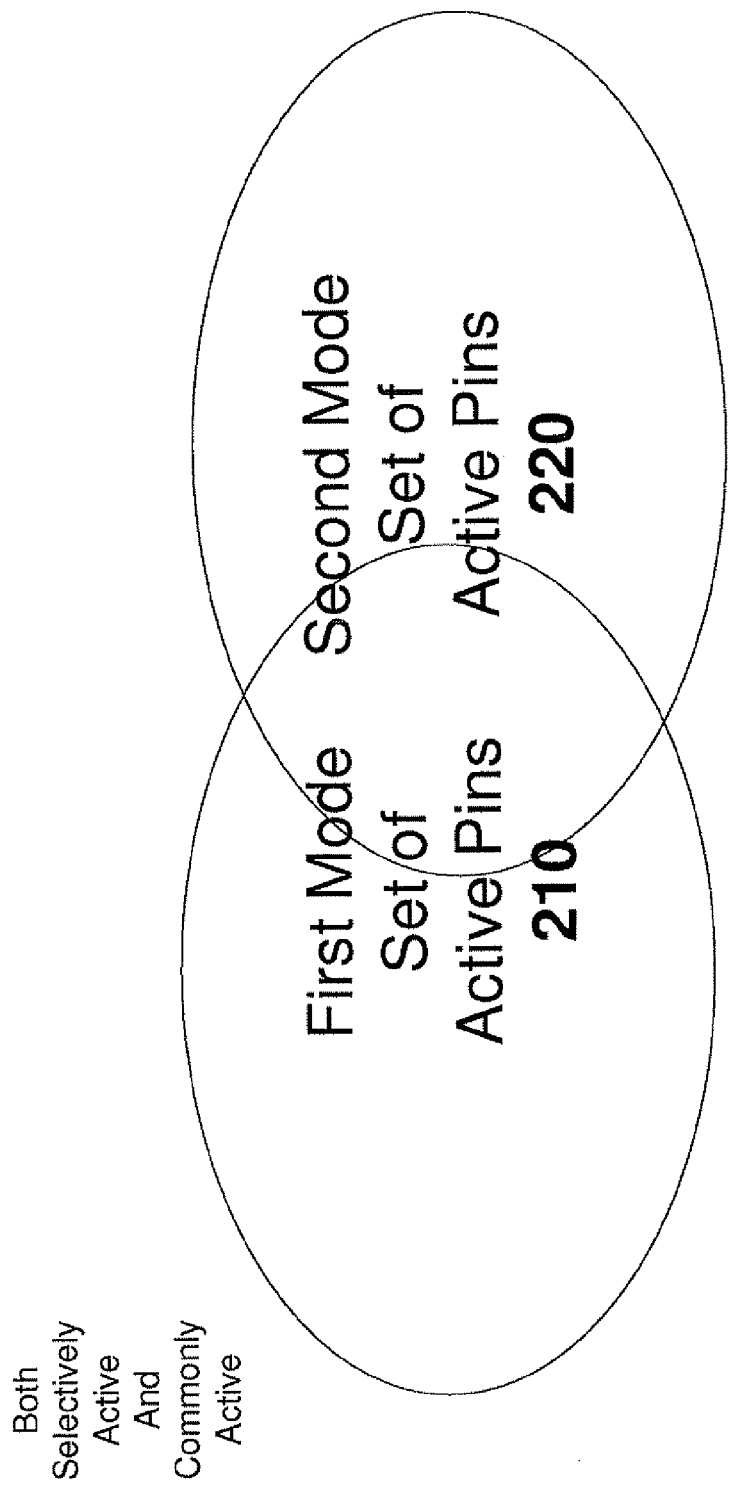
Figure 5C:
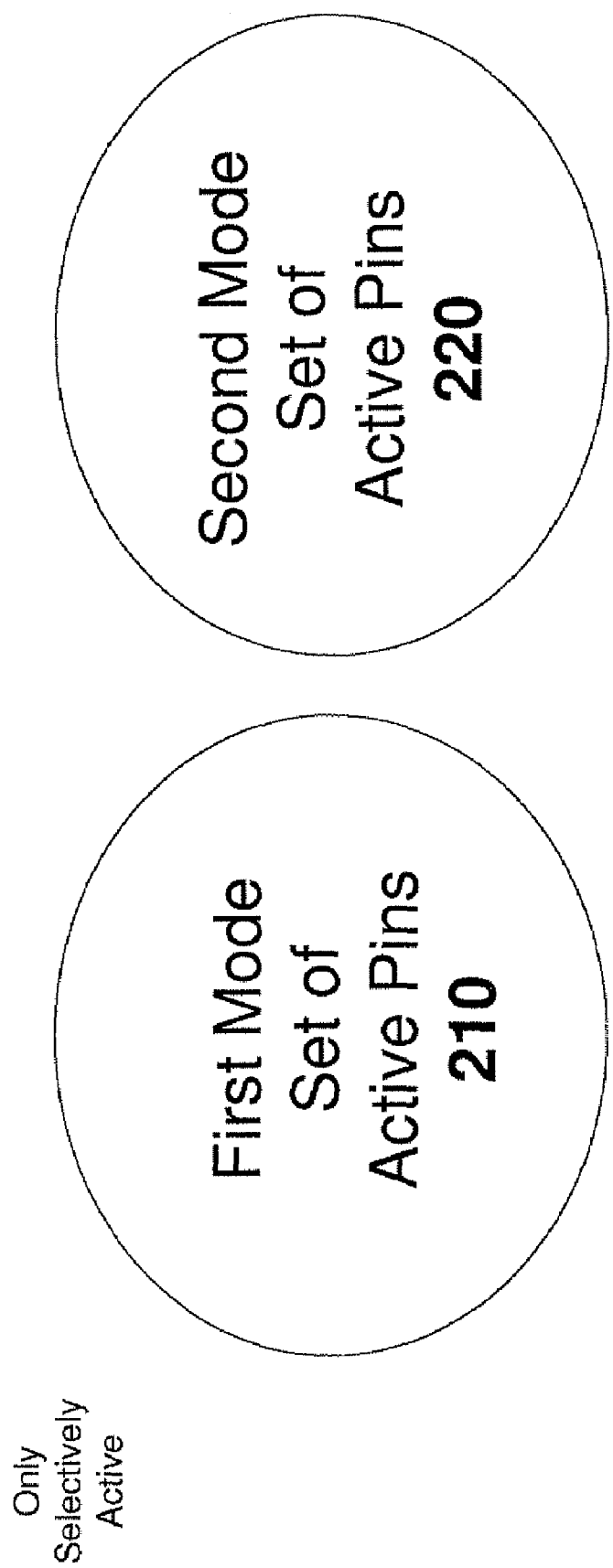

FIGS. 5A-5C provide Venn Diagrams describing which pins are active and which are dormant (i.e. for the specific male port 130 of the example of FIG. 3A0 when PSD 104 is in the 'first mode' 210 and in the 'second mode' 220.

It is noted that there is at least one pin (i.e. pins 8B and 8C) (i) which is active when PSD 104 is in the 'first' mode' (i.e. in USB mode and communicating with host 150 using a USB protocol); (ii) is dormant when PSD 104 is in the 'second mode' (i.e. in 'streaming media mode' and communicating with host 180 using a streaming media protocol such as streaming analog or digital audio and/or video).

It is noted that there is at least one pin (i.e. pins 10A-10G) (i) which is active when PSD 104 is in the 'second mode' (i.e. in 'streaming media mode' and communicating with host 180 using a streaming media protocol such as streaming analog or digital audio and/or video); (ii) is dormant when PSD 104 is in the 'first' mode' (i.e. in USB mode and communicating with host 150 using a USB protocol).

It is noted that there is at least one pin (i.e. pins 8A and 8D) which are active both when PSD 104 is in the USD mode as well as the 'streaming media' mode.

This is also illustrated in FIG. 5B. As is illustrated in the example of FIG. 5C, however, there is no requirement for pins that are active in both modes.

Figure 6:
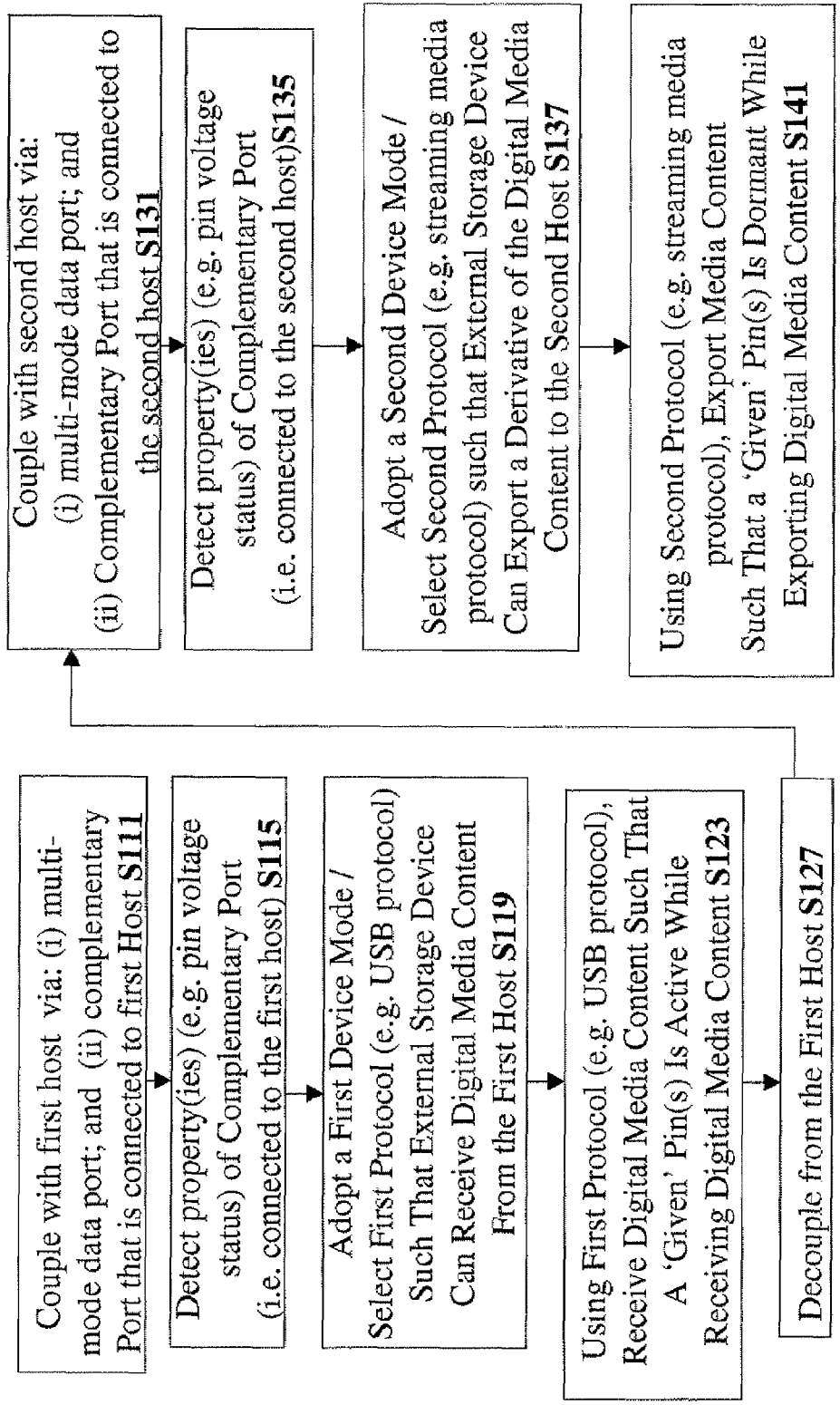
FIG. 6 provides a block diagram of an exemplary routine carried out by an external storage device.

FIG. 6 provides a flow chart of an exemplary routine for operating an external storage device (i.e. PSD 104) in accordance with some embodiments of the present invention. In step S111, PSD 104 is coupled with the first host 180 via (i) multi-mode port 130 and (ii) a complementary port that is connect to host 180. In some embodiments, upon coupling PSD 104 'powers up' by receiving power from host 180. This is not a limitation, though it obviates the need to provide a battery within the device or other electrical power.

Upon coupling, PSD 104 detects S115 one or more properties of a first host device (or of a complementary port coupled to the first host device) (for example, a mechanical property as in FIG. 3B or an electrical property—for example, an active/dormant status or a pin voltage of at least one pin as in FIG. 3C). In accordance with the detected property, PSD 104 selects S119 a device mode and protocol from a protocol of possible device modes and possible protocols (for example, PSD 104 selects the USB protocol instead of a streaming media protocol). The selected device mode is adopted S119 and the selected protocol is used to communicate with the host device (for example, host 180).

In the particular example of FIG. 6, in step S119, when PSD 104 selects the 'USB mode,' PSD 104 is operative to receive digital media content (for example, one or more files) using the selected USB protocol. In step S123, PSD 104 effects a communication with host 180 using the selected protocol—in this case, PSD 104 received one or more digital media files.

For the present disclosure, 'effecting a communication' refers to one or more of sending data from PSD 104 to a coupled host or receiving data by the PSD 104 from the host.

In step S127, PSD 104 is decoupled from the first host.

In step S131, PSD 104 detects S135 one or more properties of a second host device (or of a complementary port coupled to the second host device 150). In the specific example of FIGS. 3, 4, 7 and 8, the second host may be presentation device 150.

In accordance with the detected property, PSD 104 then selects S137 a device mode and protocol from a protocol of possible device modes and possible protocols (for example, PSD 104 selects the streaming media protocol instead of the USB protocol). The selected device mode is adopted S117 and the selected protocol is used to communicate with the host device 150.

Upon adoption of the second mode and selection of the second protocol, PSDF 104 can export S141 a media stream to host 150 using the second protocol.

In some embodiments, when step S123 is carried out, a first set of pins if active, and when step S141 is carried out, a second set of pins different from the first set of pins is active (for example, see FIGS. 5B-5C).

Furthermore, as is noted in the comment at the bottom of FIG. 6 (and as is noted in FIGS. 3B and 3C), it is possible to detect one or more features of the host and to determine a mode/protocol without sending a query to the host—for example, without attempting to use a 'candidate protocol' and ascertaining host reactions to this attempt.

Figure 8:
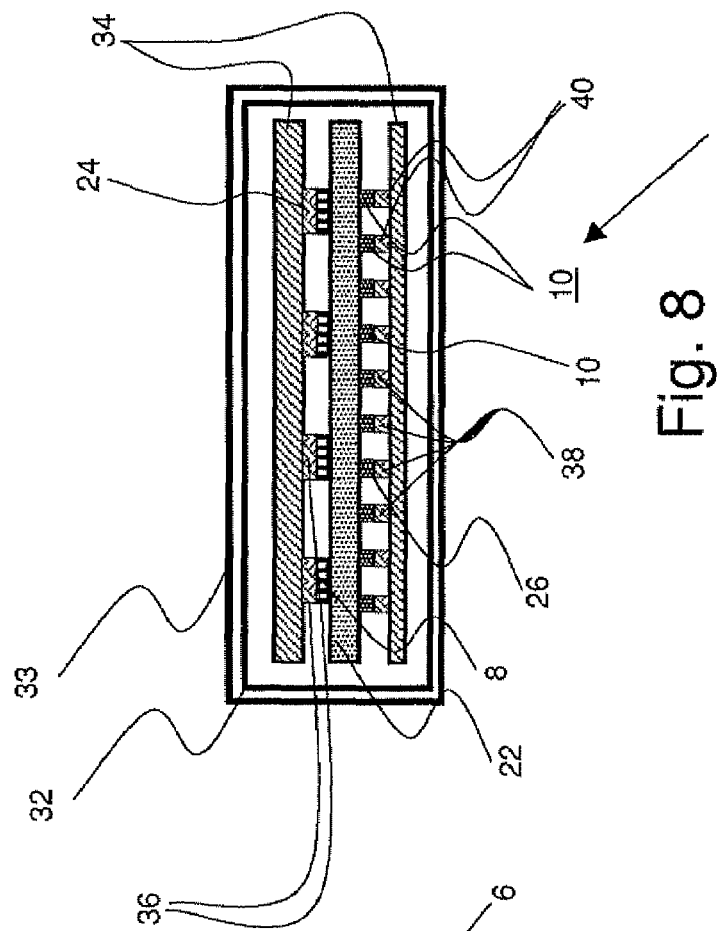
FIG. 8 provides an illustration of a cross section of an exemplary plug.
Figure 7:
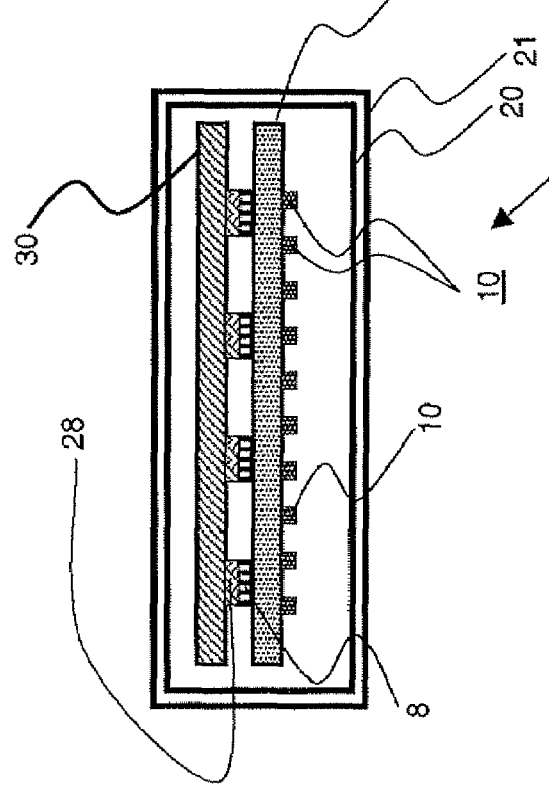
FIG. 7 provides an illustration of a cross section of an exemplary plug.

Discussion of FIGS. 7 and 8 (relating to the Example of FIG. 3A)

FIG. 7 and FIG. 8 show a cross-section through the connector of FIG. 3A, in a plane that is vertical to the direction of the pins, and crosses the pins, showing both the pins of the plug and the pins of the socket.

FIG. 7 shows the cross-section when the plug 130 is plugged into a standard digital USB socket. The connection of the connector 130 into the socket is done by inserting one shell of the plug 20 into the mating shell of the socket 21. The digital USB socket contains 4 four USB pins 28 attached to an insulating plate 30 according to the USB standard. These standard USB pins 28 are connected to the four pins of the plug 8, which are also attached to an insulating plate 6. In this connection, the special pins 10I, 10J used for identification of the socket remain unconnected, hence the connector acts as a regular digital USB connector.

FIG. 8 shows same connector when plugged into a TV set, having a special socket that is designed to mate with the plug of the present invention. Again, the connection is done by inserting the shell of the plug 32 shell into the shell of the socket 33. In this connection, the mating socket includes two insulating plates 34. On the upper plate there are four pins 36 that are in contact with the pin 8 of the connector. In addition, the socket has ten pins 38, 40, that are connected to the special pins of the connector 10, 12. The identification pins of the connector 12 are in contact with the identification pins of the socket 40, and the PSD 104, sensing this, sets the connector to the configuration of the TV set mode.

Playback Features

In some embodiments, one or more digital media items such as movies are stored within PSD 104 (or in a memory card or UFD coupled to a port of external storage device 28) and external storage device includes media player (not shown) for converting a digital file (for example, loaded onto the PSD 104 in step into streaming media. This conversion may comply with one or more of the standards of multimedia content storage, such as MPEG 3, MPEG 4, or other standards as appear in http://www.videohelp.com/dvdplayers?chipset=Sigma % 20EM8500. In one example, media player is provided as a 'playback application' that includes computer code executed by a CPU (not shown) using volatile memory (not shown) for storing software variables.

The media player is operative to export a streaming signal via device port 30 to display device 20.

Thus, some embodiments, device 100 includes a CODEC (not shown) (such as Vaddis 888, available from Zoran, see also http://www.zoran.com/Vaddis-R-888) which is used by (or part of) media player. In playback mode, the media player plays back digital multimedia content stored on either the internal storage or the external storage (for example, a memory card or a UFD), and transfers it to the CODEC. The CODEC translates the digital stream into viewable Audio/Video signals (i.e. media streaming signals) fed into the appropriate pins of multi-function device port, for displaying on the presentation device 150.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method of operating an external storage device having a multi-pin device port, the method comprising:
    a) receiving digital media content data via said multi-pin device port; and
    b) exporting a derivative of said digital media content data received via said multi-pin device port, wherein exporting the derivative of said received digital media content data includes converting the received digital media content data from a multimedia content storage format to a streaming media signal and communicating the streaming media signal from the external storage device via the multi-pin device port, wherein at least one pin of said multi-pin device port behaves, during said receiving and said exporting, as a selectively active pin that is:
    i) active during one of said receiving and said exporting; and
    ii) dormant during the other of said receiving and said exporting.

2. The method of claim 1 wherein:
    i) said digital media content is received from a first host device when the external storage device is coupled to said first host device; and
    ii) said derivative of said digital media content is exported to a second host device different from said first host device when the external storage device is coupled to said second host device.

3. The method of claim 1 wherein at least one said selectively active pin is:
    i) active during said receiving; and
    ii) dormant during said exporting.

4. The method of claim 1 wherein at least one said selectively active pin is:
    i) active during said exporting; and
    ii) dormant during said receiving.

5. The method of claim 1 wherein at least one pin other than said at least one selectively active bin behaves, during said receiving and exporting, as a commonly active pin that is active during both said receiving and said exporting.

6. The method claim 1 wherein the multi-pin device port is mated with a first socket during said receiving and a second socket during said exporting.

7. The method of claim 1 wherein:
    i) said first socket is a standard USB socket; and
    ii) said second socket is other than a USB socket.

8. The method of claim 1 further comprising:
    c) for at least one of said receiving and said exporting, upon mating with a complementary port connected to a host device,
        i) detecting at least one feature of at least one of said complementary port said connected host; and
        ii) in response to results of said detecting, selectively activating at least one said selectively active pin.

9. The method of claim 8 wherein said detecting of said at least one feature includes detecting an active/dormant status feature of at least one location of said complementary port.

10. The method of claim 9 wherein said detecting of said active/dormant status feature of said at least one location of said complementary port includes determining an active/dormant status of at least one said pin of said plurality of pins of said multimode device port.

11. The method of claim 8 wherein said detecting of said at least one feature includes detecting a mechanical feature of said complementary port.

12. The method of claim 1 further comprising:
    c) for at least one of said receiving and said exporting, upon mating with a complementary port connected to a host device,
        i) detecting at least one feature of at least one of: said complementary port said connected host; and
        ii) in response to results of said detecting, selecting and adopting one of:
            A) a first device mode where the external storage device is operative to effect said receiving of said digital media content; and B) a second device mode where the external storage device is operative to effect said exporting of said derivative of said digital media content.

13. The method of claim 1 wherein:
   i) said receiving is carried out using a first communications protocol; and
   ii) said exporting is carried out using a second communications protocol different from said first communications protocol.

14. The method of claim 13 wherein:
   i) one of said first communications protocol and said second communications protocol is a digital communications protocol; and
   ii) the other of said first and second communications protocol is an analog communications protocol.

15. The method of claim 13 wherein said exporting of said derivative of said received multi-pin device port via said multi-pin device port includes exporting of a media stream derived from said digital media content.

16. A method of operating an external storage device having a multi-pin device port, the method comprising:
   1) receiving digital media content data via said multi-pin device port; and
   2) exporting a derivative of said received multi-pin device port via said multi-pin device port,
   wherein at least one pin of said multi-pin device port behaves, during said receiving and said exporting, as a selectively active pin that is:
      i) active during one of said receiving and said exporting; and
      ii) dormant during the other of said receiving and said exporting,
   wherein at least one pin other than said at least one selectively active bin behaves, during said receiving and exporting, as a commonly active pin that is active during both said receiving and said exporting, and wherein said commonly active pin:
      i) provides data pin functionality during said receiving; and
      ii) provides voltage pin functionality supply during said exporting.

17. The method of claim 16 wherein at least one said commonly active pin:
   i) provides digital data pin functionality during said receiving; and
   ii) provides analog data pin functionality during said exporting.

18. A method of operating an external storage device having a multi-pin device port, the method comprising:
   a) receiving digital media content data via said multi-pin device port; and
   b) exporting a derivative of said received multi-pin device port via said multi-pin device port,
   wherein at least one pin of said multi-pin device port behaves, during said receiving and said exporting, as a selectively active pin that is:
      i) active during one of said receiving and said exporting; and
      ii) dormant during the other of said receiving and said exporting,
   wherein the method is carried out such that every pin of said multi-pin device port behaves as a selectively active pin during said receiving and said exporting.

19. A method of operating an external storage device having a multi-pin device port including a plurality of pins, the method comprising:

a) when the device port is coupled to a first complementary port that is a USB socket, communicating via the device port using a USB protocol; and
b) when the device port is coupled to a second complementary port that is other than a USB socket, communicating via the device port using a protocol different from said USB protocol, wherein communicating via the device port using a protocol different from the USB protocol includes converting, from a multimedia content storage format to a streaming media signal, digital media content stored in memory of the external storage device that was received via the device port using the USB protocol and communicating the streaming media signal via the device port to the complementary port.

20. The method of claim 19 further comprising:
   c) upon mating with one of said first complementary port and said second complementary port, detecting at least one feature of at least one of:
      i) a currently-mated complementary port; and
      ii) a host connected to said currently-mated complementary port; and
   d) in accordance with results of said detecting, selecting one of:
      i) said USB protocol; and
      ii) said protocol other than said USB protocol.

21. The method of claim 20 wherein said detecting of said at least one feature includes detecting an active/dormant status feature of at least one location of said currently-mated complementary port.

22. The method of claim 21 wherein said detecting of said at least one feature includes said detecting of said active/dormant status feature of said at least one location of said complementary port by determining an active/dormant status of at least one said pin of said plurality of pins of said multimode device port.

23. The method of claim 20 wherein said detecting of said at least one feature includes detecting a mechanical feature of said currently-mated complementary port.

24. A method of operating an external storage device having a multi-pin device port, the method comprising:
   a) upon mating between the device port and a complementary port, detecting an active/dormant status of at least one pin of the multi-pin device port that is mated to said complementary port; and
   b) in accordance with results of said detecting, selecting a device mode from a plurality of device modes including a first and second device mode;
   c) if said first device mode is selected, receiving digital media content data via the multi-pin device port; and
   d) if said second device mode is selected, exporting a media stream via the multi-pin device port, wherein exporting the media stream includes converting the received digital media content data from a multimedia content storage format to a streaming media signal and communicating the streaming media signal from the external storage device via the multi-pin device port.

25. A method of operating an external storage device having a multi-pin device port, the method comprising:
   a) upon mating between the device port and a complementary port, selecting, by the external storage device, a device mode from a plurality of device modes including a first and second device mode;
   b) if said first device mode is selected, receiving digital media content data via the multi-pin device port; and c) if said second device mode is selected, exporting a media stream via the multi-pin device port, wherein said selecting is carried out without using results of any query to said host device and wherein exporting the media stream includes converting the received digital media content data from a multimedia content storage format to a streaming media signal and communicating the streaming media signal from the external storage device via the multi-pin device port.

\* \* \* \* \*